(12) United States Patent
Alselimi

(10) Patent No.: US 9,111,453 B1
(45) Date of Patent: Aug. 18, 2015

(54) TRAFFIC MANAGEMENT SERVER AND A TRAFFIC RECORDING APPARATUS

(71) Applicant: Mohammad A. Alselimi, North Tonawanda, NY (US)

(72) Inventor: Mohammad A. Alselimi, North Tonawanda, NY (US)

( * ) Notice: Subject to any disclaimer, the term of this patent is extended or adjusted under 35 U.S.C. 154(b) by 238 days.

(21) Appl. No.: 13/957,070

(22) Filed: Aug. 1, 2013

(51) Int. Cl.
| | | |
|---|---|---|
| G06F 19/00 | (2011.01) | |
| G08G 1/01 | (2006.01) | |
| G08G 1/16 | (2006.01) | |
| G06K 9/00 | (2006.01) | |
| H04N 7/18 | (2006.01) | |

(52) U.S. Cl.
CPC ............ G08G 1/166 (2013.01); G06K 9/00785 (2013.01); H04N 7/18 (2013.01)

(58) Field of Classification Search
USPC ........................................... 701/117; 340/933
See application file for complete search history.

(56) References Cited

U.S. PATENT DOCUMENTS

| 7,450,029 | B2 * | 11/2008 | Vickas | 340/901 |
|---|---|---|---|---|
| 2007/0038772 | A1 * | 2/2007 | Obata | 709/232 |
| 2009/0143986 | A1 * | 6/2009 | Stein et al. | 701/301 |
| 2011/0046867 | A1 * | 2/2011 | Oexmann | 701/117 |
| 2012/0109447 | A1 * | 5/2012 | Yousefi et al. | 701/32.2 |
| 2012/0277950 | A1 * | 11/2012 | Plante et al. | 701/31.5 |
| 2013/0282277 | A1 * | 10/2013 | Rubin et al. | 701/517 |
| 2014/0067206 | A1 * | 3/2014 | Pflug | 701/41 |

FOREIGN PATENT DOCUMENTS

| KR | 2009090464 A | 8/2009 |
|---|---|---|
| KR | 2010073893 A | 7/2010 |
| WO | WO 2007/109091 A2 | 9/2007 |
| WO | WO 2008/143480 A2 | 11/2008 |
| WO | WO 2009/009202 A2 | 1/2009 |

* cited by examiner

*Primary Examiner* — Thomas G Black
*Assistant Examiner* — Tyler Paige
(74) *Attorney, Agent, or Firm* — Oblon, McClelland, Maier & Neustadt, L.L.P.

(57) ABSTRACT

A traffic management server that decreases traffic accidents and enhances post traffic accident resolution that includes a receiver that receives (i) first information that includes: first video data recorded by a first camera on the first vehicle, first vehicle condition information of the first vehicle, first driver information of the first vehicle and first GPS information indicating a position of the first vehicle, (ii) second information, that includes: second video data, second vehicle condition information of the second vehicle, second driver information of the second vehicle and second GPS information indicating a position of the second vehicle, (iii) third information that includes third video data recorded by a surveillance camera in an area, (iv) fourth information that includes a chronological color change record of a traffic light in the area, and (v) fifth information that includes traffic sign information of the area.

19 Claims, 13 Drawing Sheets

|  | Vehicle 1 | Vehicle 2 | risk index |
|---|---|---|---|
| relative distance | W feet | | 3 |
| relative angle | X degree | | 5 |
| relative speed | Y feet/s | | 4 |
| relative acceleration | Z feet/s² | | 2 |
| ignoring traffic light | Yes | No | 4 |
| speeding offence | K miles/h over | No | 8 |
| drunk driving | Yes | No | 20 |
| Total | - | - | 41 |

FIG. 7

|                         | Vehicle 1 | Vehicle 2 |
|-------------------------|-----------|-----------|
| ignoring traffic light  | 0         | 5         |
| speeding offence        | 5         | 10        |
| drunk driving           | 0         | 20        |
| deviation from the lane | 0         | 5         |
| Total                   | 5         | 40        |

FIG. 11

|  | Vehicle 1 | Vehicle 2 |
| --- | --- | --- |
| ignoring traffic light | 0 | 5 |
| speeding offence | 0 | 20 |
| drunk driving | 0 | 0 |
| deviation from the lane | 0 | 5 |
| Total | 0 | 30 |

FIG. 13

TRAFFIC MANAGEMENT SERVER AND A TRAFFIC RECORDING APPARATUS

This application was prepared with financial support from the Saudia Arabian Cultural Mission, and in consideration therefore the present inventor(s) has granted The Kingdom of Saudi Arabia a non-exclusive right to practice the present invention.

BACKGROUND

Field of the Disclosure

The present disclosure relates to a traffic management server and a traffic recording apparatus, and more particularly, relates to a traffic management server and a traffic recording apparatus that decreases traffic accidents and enhances post traffic accidents resolution.

SUMMARY

The foregoing paragraphs have been provided by way of general introduction, and are not intended to limit the scope of the following claims. The described embodiments, together with further advantages, will be best understood by reference to the following detailed description taken in conjunction with the accompanying drawings.

Among other things, the present disclosure provides a traffic management server and a traffic recording apparatus that decreases traffic accidents and enhances post traffic accident resolution. In one example embodiment, the traffic management server includes a receiver that receives (i) first information, that is recorded by a first recorder on a first vehicle, that includes: first video data recorded by a first camera on the first vehicle, first vehicle condition information of the first vehicle, first driver information of the first vehicle and first GPS information indicating a position of the first vehicle, (ii) second information, that is recorded by a second recorder on a second vehicle, that includes: second video data recorded by a second camera on the second vehicle, second vehicle condition information of the second vehicle, second driver information of the second vehicle and second GPS information indicating a position of the second vehicle, (iii) third information that includes third video data recorded by a surveillance camera in an area, (iv) fourth information that includes a chronological color change record of a traffic light in the area, and (v) fifth information that includes traffic sign information of the area; a non-transitory storage device that stores information received by the receiver; a user interface that is configured to display the information stored in the non-transitory storage device, and receive an input; processing circuitry that is configured to determine whether the first vehicle and the second vehicle are in danger of a collision with each other by calculating whether a risk index, which is calculated based on relative positions of the first vehicle and the second vehicle, relative movements of the first vehicle and the second vehicle, and/or a type of traffic violation committed by the first vehicle and/or the second vehicle, exceeds a predetermined value or not, and determine which of the first vehicle or the second vehicle is liable for the collision when the first vehicle and the second vehicle collide by (1) adding points to the first vehicle and/or the second vehicle according to a type of traffic violation committed by the first vehicle and/or the second vehicle within predetermined time of the collision and (2) comparing the points of the first vehicle and the second vehicle; and a transmitter that is configured to transmit alert information to the first vehicle and the second vehicle when the processing circuitry determines the first vehicle and the second vehicle are in danger of a collision, and transmit information on which of the first vehicle or the second vehicle is liable for the collision to a predetermined facility.

In another example embodiment, the traffic recording apparatus on a first vehicle includes a camera that records video data; a sensor module that detects vehicle condition information including a speed, an acceleration and brake timing of the first vehicle, and driver information; a GPS module that detects a position of the first vehicle; a microphone that records internal audio of the first vehicle; a non-transitory storage device that records information obtained by the camera, the sensor module, the GPS module, and the microphone; a transmitter that transmits the information recorded by the recorder to a traffic management server; a receiver that receives alert information from the traffic management server indicating that the first vehicle is in danger of colliding with a second vehicle; a user interface that alerts the driver that the first vehicle is in danger of colliding with the second vehicle; a communication unit that enables the driver to communicate with people outside of the first vehicle; and processing circuitry that controls the first vehicle to avoid colliding with the second vehicle when the receiver receives the alert information; wherein the information recorded by the recorder is not editable by the driver, and the processing circuitry controls the recorder to erase the information recorded on the non-transitory storage device every predetermined period or when data amount recorded on the non-transitory storage device reaches a predetermined amount; and wherein the receiver receives information on which of the first vehicle or the second vehicle is liable for a collision from the traffic management server when the first vehicle and the second vehicle collide.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 7 is an exemplary table of risk index;

FIG. 11 is an exemplary table of points assigned to Vehicle 1 and Vehicle 2;

FIG. 13 is another exemplary table of points assigned to Vehicle 1 and Vehicle 2.

DETAILED DESCRIPTION OF THE EMBODIMENTS

Figure 1:
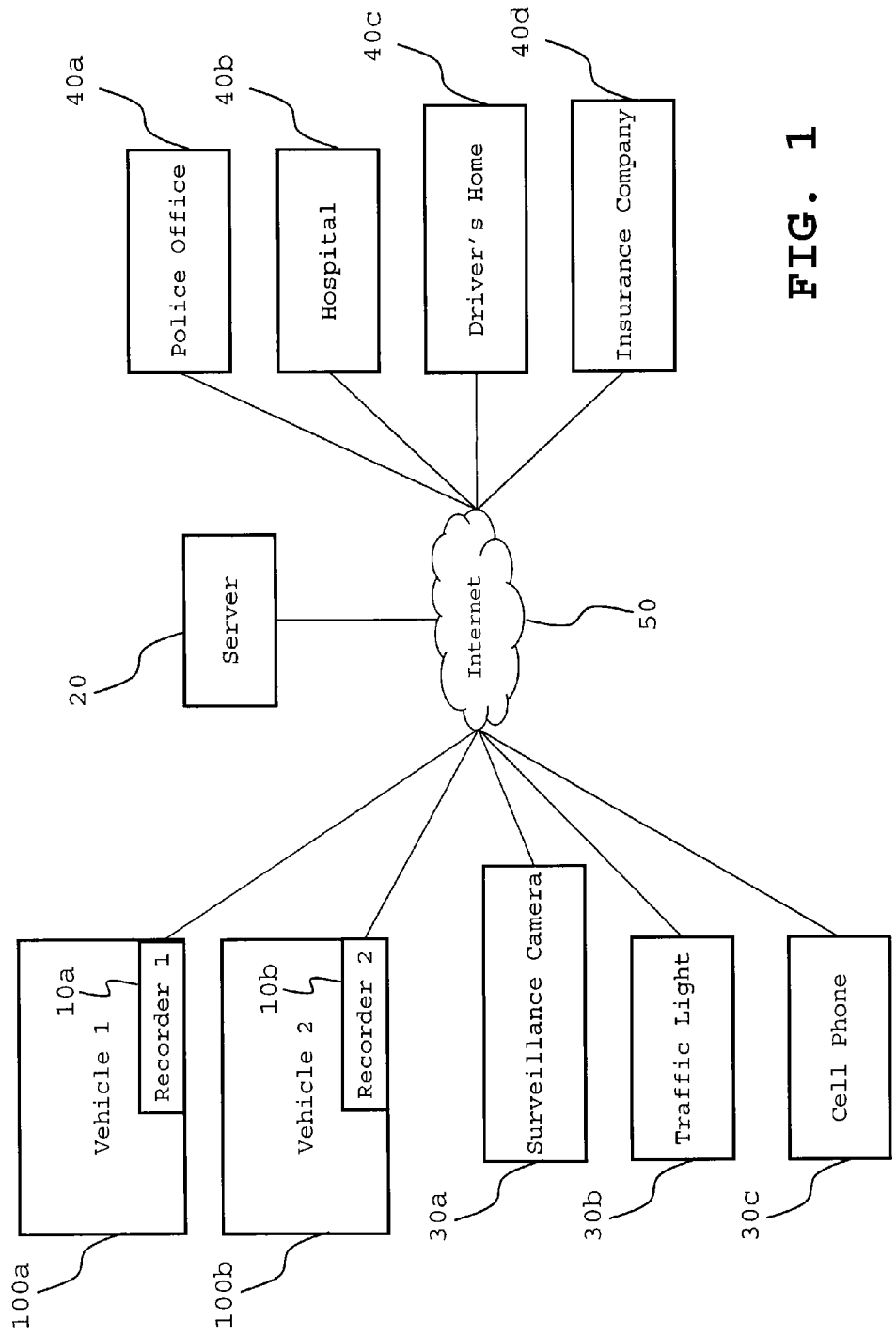
FIG. 1 is an exemplary traffic management system according to one embodiment.

Referring now to the drawings, wherein like reference numerals designate identical or corresponding parts throughout the several views, FIG. 1 is an exemplary traffic management system according to one embodiment. For example, Vehicle 1 (100a) includes a traffic recording apparatus 10a and Vehicle 2 (100b) includes a traffic recording apparatus 10b, and each of the traffic recording apparatus 10a and 10b can transmit information recorded in it to a traffic management server 20 through the communication network, such as internet 50. Here, for purposes of illustration, only two vehicles are illustrated, but other vehicles include the traffic recording apparatus. The communication network may be other networks, such as, a telephone network or a wireless network. External traffic information sources, such as a surveillance camera 30a, a traffic light 30b, or a cell phone 30c transmit information to the traffic management server 20 through the internet 50. For example, the surveillance camera 30a may be fixed on a street and record traffic information on the street. The traffic light 30b may be a traffic light on a street and transmit a chronological color change record of the traffic light to the traffic management server 20. The cell phone 30c may be held by a pedestrian on the street and video and/or audio data recorded by the cell phone 30c may be transmitted to the traffic management server 20 by the pedestrian.

The traffic management server 20 receives information from Vehicle 1(100a), Vehicle 2(100b), a surveillance camera (s) 30a, a traffic light(s) 30b and/or a cell phone(s) 30c through the internet 50, and analyze a potential risk of accident. Based on the analysis, the traffic management server 20 transmits information to or communicate with appropriate facilities, such as a police office 40a, a hospital 40b, a driver's home 40c and/or an insurance company 40d. The traffic management server 30 may also analyze which of the driver in Vehicle 1(100a) or Vehicle 2(100b) is liable for an traffic accident when an traffic accident occurs based on information received from Vehicle 1(100a), Vehicle 2(100b), a surveillance camera (s) 30a, a traffic light(s) 30b and/or a cell phone (s) 30c. Based on the liability analysis, the traffic management server 20 transmits information to or communicates with appropriate facilities, such as the police office 40a, the hospital 40b, the driver's home 40c, or the insurance company 40d.

Figure 2:
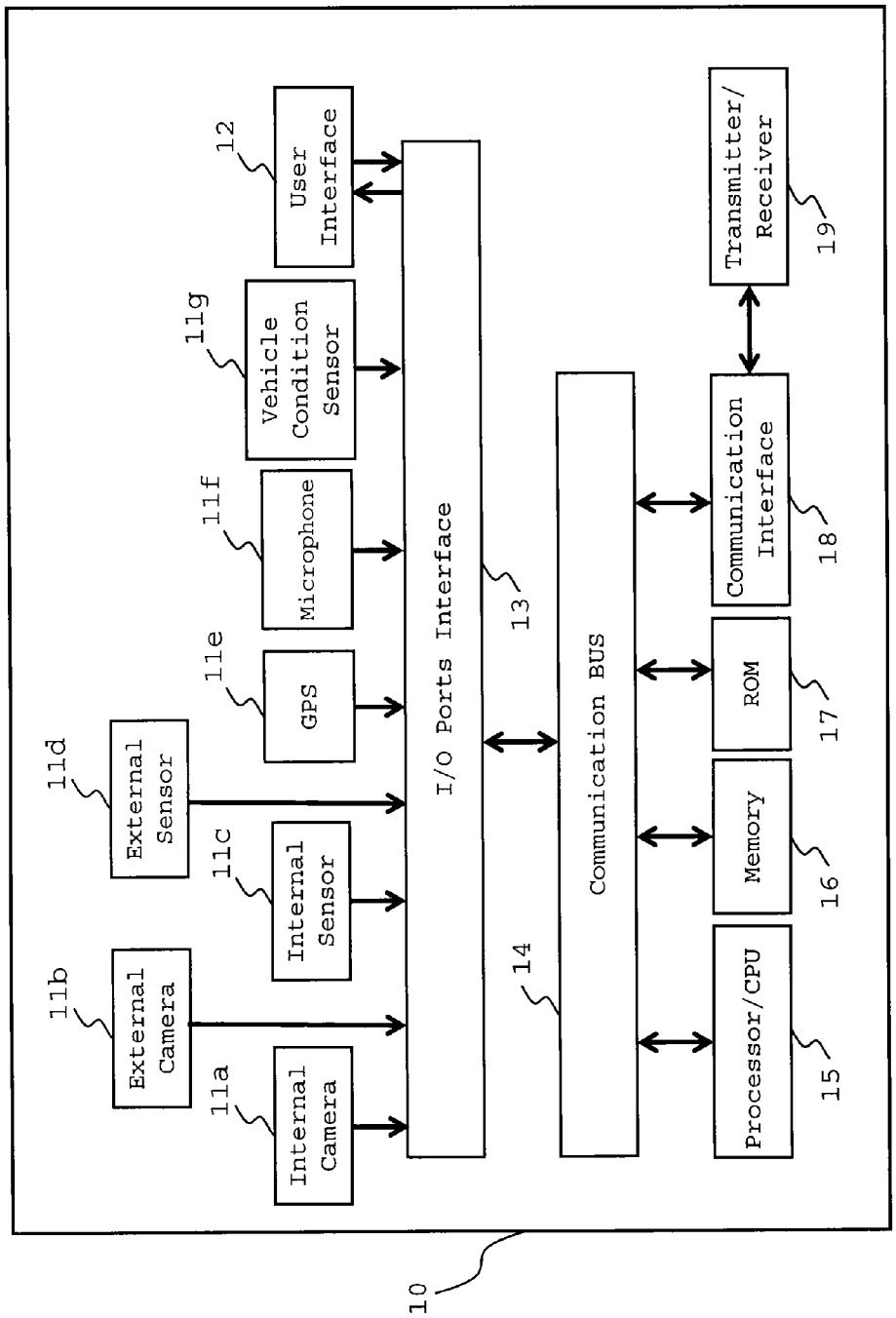
FIG. 2 is an exemplary block diagram of a traffic recording apparatus.

FIG. 2 is an exemplary block diagram of a traffic recording apparatus 10 which is located on a vehicle. The traffic recording apparatus 10 includes sensors 11a to 11g to record what is happening inside and/or outside the vehicle. In this embodiment, these sensors 11a to 11g keep on obtaining data whenever the vehicle is running or whenever the engine is activated. For example, these sensors 11a to 11g turn on and start obtaining data when the engine is activated, when the vehicle starts running, or when the vehicle key is inserted to the vehicle. These sensors 11a to 11g turn off and stop obtaining data when the engine is deactivated, when the vehicle stops running, or when the vehicle key is pulled out of the vehicle. The timing to be activated and deactivated may differ according to the type of sensors. For example, GPS 11e or vehicle condition sensor 11g starts obtaining data only when the vehicle starts running and stop obtaining data only when the vehicle stops running. On the other hand, internal camera 11a, external camera 11b, internal sensor 11c, external sensor 11d and/or microphone 11f starts obtaining data when the vehicle key is inserted or when the engine is activated, and stop obtaining data when the vehicle key is pulled out or when the engine is deactivated.

The traffic recording apparatus 10 includes an internal camera 11a to record what is occurring inside the vehicle at any given time, including what internal occupants are doing at any given time. For example, the internal camera 11a may record whether the driver was distracted with talking on the phone or some other improper activity at the time of the traffic accident. The traffic recording apparatus 10 also includes an external camera 11b to record what is occurring outside the vehicle at any given time, which includes video data showing where in a driving lane the vehicle is running, or video data showing the scenery around the vehicle, such as a passing pedestrian or truck that impedes the driver's vision. For example, the external camera 11b records whether the vehicle was inside or outside the driving lane, the relative position or relative angle of the vehicle and another vehicle, or the color of a traffic light at the time of the traffic accident.

The traffic recording apparatus 10 includes an internal sensor 11c to detect what live activity is happening inside the vehicle, such as an infrared radiation sensor to detect the existence or characteristics of the driver, a breath analyzer to detect whether the driver is drunken or not, a facial recognition sensor to detect whether the driver's eyes are closed, a weight scale or fingerprint recognition sensor to detect whether a true owner of the vehicle is driving or not, or a temperature sensor to detect a bodily temperature of the driver.

The traffic recording apparatus 10 includes an external sensor 11d to detect what is happening outside the vehicle, such as an image recognition sensor to detect whether the vehicle is driving inside a driving lane or not, an infrared radiation sensor to measure the distance between the vehicle and objects around the vehicle, or a human sensor to detect a human around the vehicle.

The traffic recording apparatus 10 includes a GPS (Global Positioning System) 11e to detect a current position of the vehicle. The traffic recording apparatus 10 includes a microphone 11f to record audio data inside the vehicle. For example, the microphone 11f record a dispute between internal occupants, snore of the driver, an utterance of a passenger regarding an observed internal or external event, or the voice of the driver speaking over the phone at the time of the traffic accident.

The traffic recording apparatus 10 include a vehicle condition sensor 11g to detect vehicle conditions, such as a current speed, acceleration, or rotation speed of a shaft (e.g. revolutions per minute (RPM)) of the vehicle, timing and amplitude of the pressure on an accelerator pedal and/or a brake pedal, the amount of gasoline in the gasoline tank, a temperature inside the vehicle, a temperature of the cooling water, or an accumulative number of miles driven.

The traffic recording apparatus 10 includes a user interface 12 through which occupants inside the vehicle can communicate with the traffic management server 20 or the external facilities 40a to 40d. The user interface 12 may include a microphone, a keyboard, a speaker, a touchpanel, and/or a display. For example, when alert information indicating that the vehicle is in danger of colliding with another vehicle is transmitted from the traffic management server 20, alert sound may be output from the speaker or an alert message may be displayed on the display. In another example, when a traffic accident happened, the occupants request an emergency help from the microphone or the keyboard. In the other example, parents in the driver's home 40c communicate with a young driver in the vehicle through the user interface 12 and check-on him, and in case the parents detect some emergency they can communicate with the police office 40a and request emergency help. As governed by the processor/CPU 15, the transmitter/receiver 19 transmits a message either directly to the parents or via a messaging center to alert the parents (or perhaps the police) if their child, or another person, starts driving the car during a period when the child is not supposed to be driving. This is particularly useful for governing the conduct of younger drivers who may have a restricted driver's license and cannot legally drive a car during certain hours of the night and early morning.

The internal camera 11a, external camera 11b, internal sensor 11c, external sensor 11d, GPS 11e, microphone 11f, vehicle condition sensor 11g, and user interface 12 are connected to I/O ports interface 13 and exchange data with the interface. The I/O ports interface 13 include logic to interpret the device address generated by the processor/CPU 15. I/O ports interface 13 also includes a hand-shaking logic so that the processor/CPU 15 can communicate with an I/O device (such as the internal camera 11a, external camera 11b, internal sensor 11c, external sensor 11d, GPS 11e, microphone 11f, vehicle condition sensor 11g, or user interface 12) through the interface. I/O ports interface 13 is also connected to communication BUS 14. Communication BUS 14 is also connected to processor/CPU 15, memory 16, ROM 17 and communication interface 18. Communication BUS 14 stores information and instructions to be executed by the processor/CPU 15 and manages the signal transaction between each component in the traffic recording apparatus 10. Communication BUS 14 includes a data bus to carry information, an address bus to determine where the information should be sent and a controls bus to determine its operation.

Processor/CPU 15 executes one or more sequences of one or more instructions contained in a memory, such as memory 16. Such instructions may be read into the memory 16 from another computer readable medium, such as a hard disk or removable media drive. One or more processors in a multi-processing arrangement may also be employed to execute the sequences of instructions contained in memory 16. In alternative embodiments, hard-wired circuitry may be used in place of or in combination with software instructions. Thus, embodiments are not limited to any specific combination of hardware circuitry and software.

As stated above, the traffic recording apparatus 10 includes at least one computer readable medium or memory, such as memory 16, for holding instructions programmed according to the teachings of the present disclosure and for containing data structures, tables, records, or other data described herein. Examples of non-transitory storage device are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes, a carrier wave, or any other medium from which a computer can read.

Stored on any one or on a combination of computer readable medium, the present disclosure includes software for controlling the traffic recording apparatus 10. Such software includes, but is not limited to, device drivers, operating systems, development tools, and applications software. Such computer readable medium further includes the computer program product of the present disclosure for performing all or a portion (if processing is distributed) of the processing performed in implementing the disclosure.

The computer code devices of the present disclosure may be any interpretable or executable code mechanism, including but not limited to scripts, interpretable programs, dynamic link libraries (DLLs), Java classes, and complete executable programs. Moreover, parts of the processing of the present disclosure may be distributed for better performance, reliability, and/or cost.

The term "computer readable medium" as used herein refers to any non-transitory medium that participates in providing instructions to the processor/CPU 15 for execution. A computer readable medium takes many forms, including but not limited to, non-volatile media, volatile media, and transmission media. Non-volatile media includes, for example, optical magnetic disks, and magneto-optical disks, such as the hard disk or the removable media drive. Volatile media includes dynamic memory, such as the memory 16. Transmission media includes coaxial cables, copper wire and fiber optics, including the wires that make up the communication bus 14. Transmission media also takes the form of acoustic or light waves, such as those generated during radio wave and infrared data communications.

Various forms of computer readable media may be involved in carrying out one or more sequences of one or more instructions to processor/CPU 15 for execution. For example, the instructions may initially be carried on a magnetic disk of a remote computer. The remote computer can load the instructions for implementing all or a portion of the present disclosure remotely into a dynamic memory and send the instructions over a telephone line using a modem. A modem local to the traffic recoding apparatus 10 receives the data on the phone line and use an infrared transmitter to convert the data to an infrared signal. An infrared detector coupled to the communication bus 14 can receive the data carried in the infrared signal and place the data on the communication bus 14. The communication bus 14 carries data to the memory 16, from which the processor/CPU 15 retrieves and executes the instructions. The instructions received by the memory 16 may optionally be stored on storage device either before or after execution by processor/CPU 15.

Memory 16 is any non-transitory storage device such as compact discs, hard disks, floppy disks, tape, magneto-optical disks, PROMs (EPROM, EEPROM, flash EPROM), random access memory (RAM), DRAM, SRAM, SDRAM, or any other magnetic medium, compact discs (e.g., CD-ROM), or any other optical medium, punch cards, paper tape, or other physical medium with patterns of holes, a carrier wave, or any other medium from which a computer can read and coupled to the communication bus 14 for storing information and instructions by the processor/CPU 15. In addition, the memory 16 may be used for storing temporary variables or other intermediate information during the execution of instructions by the processor/CPU 15.

The traffic recording apparatus 10 further includes a read only memory (ROM) 17 or other static storage device (e.g., programmable ROM (PROM), erasable PROM (EPROM), and electrically erasable PRM (EEPROM)) coupled to the communication bus 14 for storing static information and instructions for the processor/CPU 15.

The data obtained by the internal camera 11a, external camera 11b, internal sensor 11c, external sensor 11d, GPS 11e, microphone 11f, vehicle condition sensor 11g is recorded to memory 16. In this embodiment, because the data obtained by these sensors 11a to 11g is used later to analyze the risk of collision or liability of collision by the traffic management server, it is preferable that the data obtained by these sensors 11a to 11g are not editable by the internal occupants (including a driver) of the vehicle and avoid a falsification. Therefore, for example, the data obtained by the sensors 11a to 11g may be stored in the region of the memory 16 which is not editable by the occupants or the data may be encrypted so that only the traffic management server which has a password or decryption key can edit it.

In addition, because the data obtained by these sensors 11a to 11g keep on accumulating, it is preferable that the processor/CPU 15 controls the memory 16 to erase the information obtained by the sensors 11a to 11g and recorded on the memory 16 every predetermined period (e.g., 1 day, 5 hours or 10 minutes) or when the data amount recorded on the memory 16 reaches a predetermined amount (e.g., 50 Gb). As the data obtained by these sensors 11a to 11g is sent to the traffic management server 20 periodically and stored in a non-transitory storage device 26 in the server 20, it is not a problem that the data recorded on the memory 16 is erased.

The traffic recording apparatus 10 also includes a communication interface 18 coupled to the communication BUS 14. The communication interface 18 provides a two-way data communication coupling to a network link (not shown) that is connected to, for example, wireless communication network (e.g., cellular networks or wireless LAN). In any such implementation, the communication interface 18 sends and/or receives electrical, electromagnetic or optical signals that carry digital data streams representing various types of information. The communication interface 18 may be further connected to a transmitter/receiver 19 including a transmitter and a receiver.

The network link typically provides data communication through one or more networks to other data devices. For example, the network link provides a connection to the traffic management server 20 through the wireless communications network. The traffic recording apparatus 10 transmits and/or receives data, including program code, through the network(s), the network link, the transmitter/receiver 19 and the communication interface 18.

The processor/CPU 15 controls the transmitter/receiver 19 to transmit information obtained by the sensors 11a to 11g and recorded to the memory 16 to the traffic management server 20 periodically (e.g., every 5 seconds). The period to transmit information to the traffic management server 20 automatically changes according to the location of the vehicle detected by the GPS 11e (e.g., when the vehicle is in an area A where the traffic quantity is not high, the obtained information is transmitted every 20 seconds, and when the vehicle is in an area B where the traffic quantity is high, the obtained information is transmitted every 3 seconds). In another example, the period to transmit information to the traffic management server 20 automatically changes according to the current speed of the vehicle detected by the vehicle condition sensor 11g (e.g., when the vehicle is driving at below 50 MPH, the obtained information is transmitted every 10 seconds, and when the vehicle is driving at over 50 MPH, the obtained information is transmitted every 3 seconds).

The processor/CPU 15 also controls the transmitter/receiver 19 to transmit information input from the user interface 12 to the designated facilities as mentioned above.

The transmitter/receiver 19 receives alert information, indicating that the vehicle is in danger of colliding with another vehicle, from the traffic management server 20. Then the processor/CPU 15 controls the user interface 12 to output the alert (e.g., alert sound may be output from the speaker or an alert message may be displayed on the display). At the same time, the processor/CPU 15 controls the vehicle to avoid the traffic accident according to the alert information. For example, the alert information includes information that "another vehicle is located at distance X feet at relative angle Y degree" and the processor/CPU 15 controls the vehicle to turn for direction or slow down to avoid a collision.

The transmitter/receiver 19 also receives information on the liability of the traffic accident from the traffic management server 20 when the traffic accident occurs. Then the processor/CPU 15 controls the user interface 12 to display the information on the liability. For example, if the driver on the vehicle does not agree with the information that the driver is liable for the accident, the driver objects to the judgment made by the traffic management server 20 by sending additional information (e.g., the driver got a heart attack and could not control the vehicle) to the traffic management server 20.

In another example, the processor/CPU 15 compares the driver information (e.g., face pattern, weight or fingerprint of the driver) obtained by the internal sensor 11c to preregistered driver information stored in the memory 16 and analyze the similarity. Then, if the similarity is not within a predetermined range, the processor/CPU 15 controls the vehicle not to start the engine as there is a risk that the vehicle is being stolen by a thief. At the same time, the processor/CPU 15 controls the transmitter/receiver 19 to transmit alert information to a preregistered destination (e.g., the driver's house) to let the driver or his family know that the vehicle might be being stolen.

In the other example, the processor/CPU 15 controls the transmitter/receiver 19 to transmit alert information, indicating that the driver is drunk, to the traffic management server 20. At the same time, the processor/CPU 15 controls the vehicle to slow down and stop.

Figure 3:
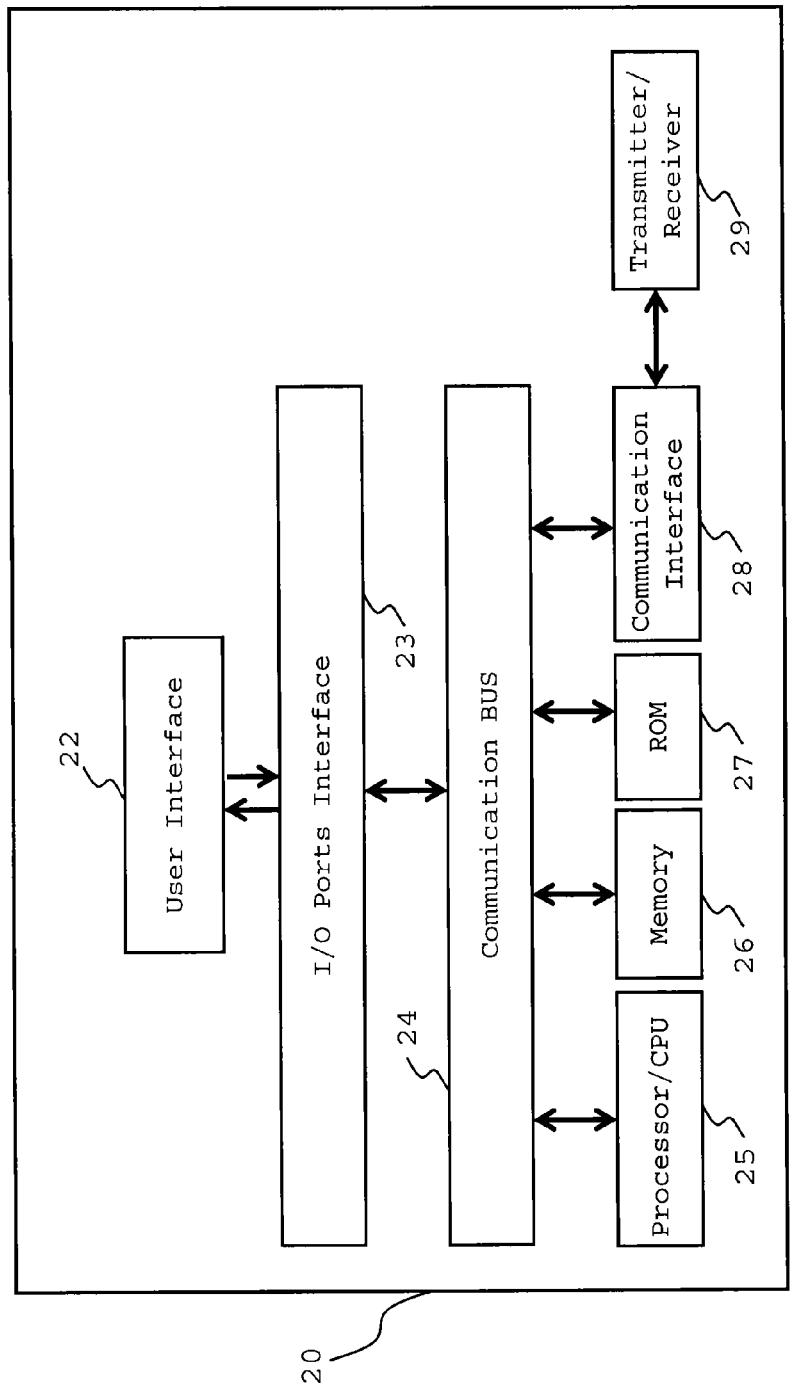
FIG. 3 is an exemplary block diagram of a traffic management server.

FIG. 3 is an exemplary block diagram of a traffic management server. Many of the components perform a similar function to those described in FIG. 2. The traffic management server 20 receives information transmitted from the Vehicle1 (100a), the Vehicle2 (100b), surveillance camera 30a, traffic light 30b and/or cell phone 30c by a transmitter/receiver 29 and stores the information to a memory 26 (non-transitory storage device). The received information stored in the memory 26 is displayed on a user interface 22 (e.g., CRT or LCD display). The processor/CPU 25 analyzes the received information stored in the memory 26 and determine whether the Vehicle 1 (100a) is in danger of a collision with the Vehicle 2 (100b), and which of the Vehicle 1 (100a) or Vehicle 2 (100b) is liable for the collision when the Vehicle 1 (100a) and the Vehicle 2 (100b) collide with each other. The processor/CPU 25 controls the transmitter/receiver 29 to transmit alert information to the Vehicle 1 (100a) and the Vehicle 2 (100b) when the processor/CPU 25 determines the Vehicle 1 (100a) and the Vehicle 2 (100b) are in danger of a collision with each other. The processor/CPU 25 also controls the transmitter/receiver 29 to transmit information on which of the Vehicle 1 (100a) or the Vehicle2 (100b) is liable for the collision to a predetermined facility (e.g., external facilities 40a to 40d).

Figure 4:
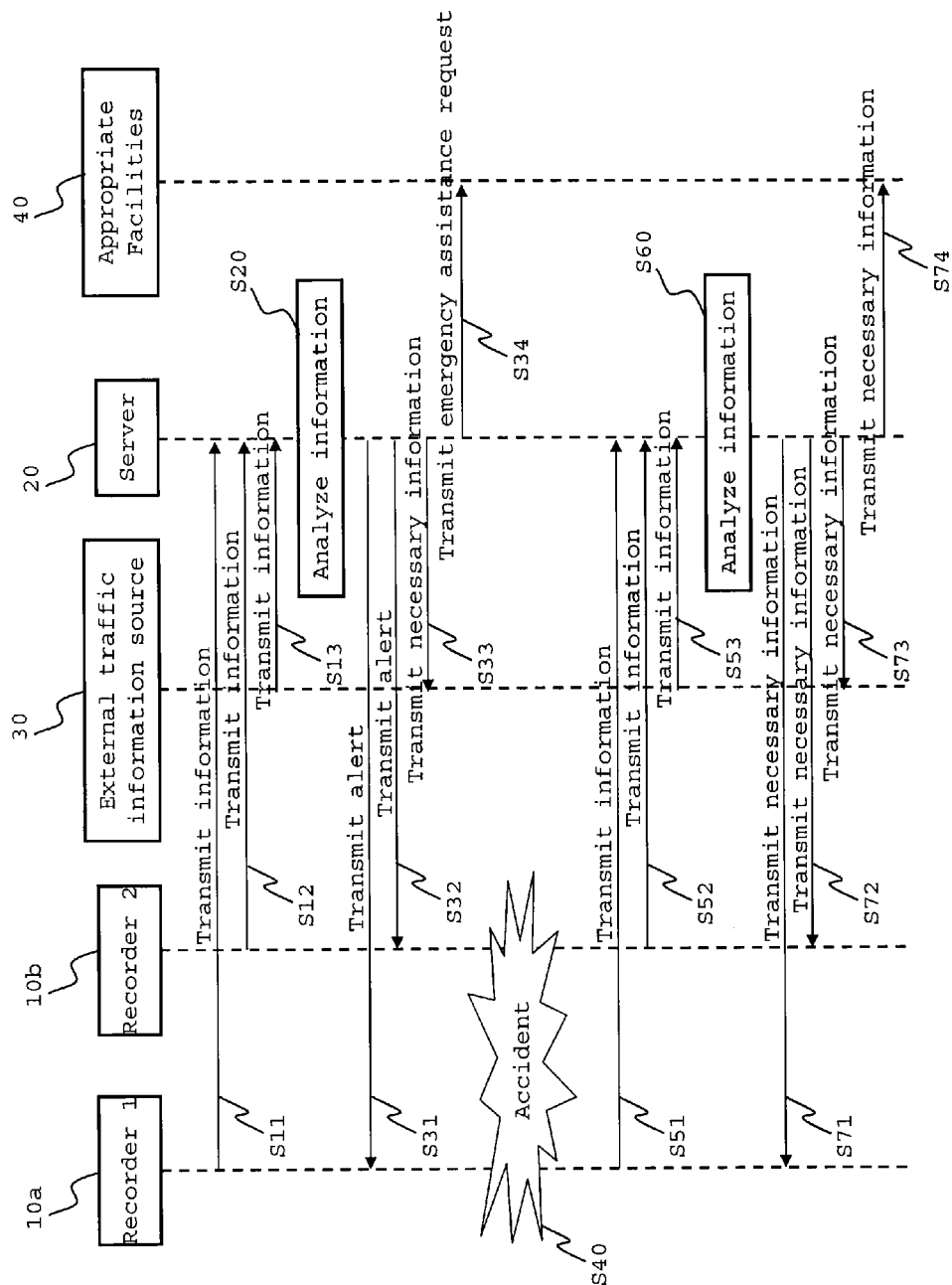
FIG. 4 is an exemplary flowchart of a method of a traffic management system.

FIG. 4 is an exemplary flowchart of a method of a traffic management system. At S11, the recorder 1 (10a) on the Vehicle 1 (100a) transmits information recorded by the recorder 1 (10a) to the traffic management server 20. At S12, the recorder 2 (10b) on the Vehicle 2 (100b) also transmits information recorded by the recorder 2 (10b) to the traffic management server 20. At S13, the external traffic information source 30 (e.g., surveillance camera 30a, traffic light 30b and/or cell phone 30c) transmits information recorded by the external traffic information source 30 or stored in it to the traffic management server 20.

At S20, the traffic management server 20 analyzes the received information and determines whether the Vehicle 1 (100a) is in danger of a collision with the Vehicle 2 (100b). Detailed steps of this analysis are described in FIG. 5.

At S31, the traffic management server 20 transmits alert information to the recorder 1 (10a) to alert the driver in the Vehicle 1 (100a) that the Vehicle 1 (100a) is in danger of a collision with the Vehicle 2 (100b). At S32, the traffic management server 20 also transmits alert information to the recorder 2 (10b). At S33, for example, the traffic management server 20 transmits necessary information, such as alert message that the Vehicle 2 (100b) is driving dangerously to the cellphone of a pedestrian near the Vehicle 2 (100b). The traffic management server 20 transmits control signal to a traffic light 30b to change the color of traffic light 30b to avoid the collision. The traffic management server 20 transmits control signal to a surveillance camera 30a to change shooting angle to better shoot the Vehicle 1 (100a) and Vehicle 2 (100b). At S34, the traffic management server 20 transmit an emergency assistance request to appropriate facilities 40. For example, the traffic management server 20 transmits assistance request message to the police office 40a close to the vehicles to stop the Vehicle 2 (100b) driving dangerously.

At S40, the Vehicle 1 (100a) and the Vehicle 2 (100b) collides. At S51, S52 and S53, the recorder 1 (10a), the recorder 2 (10b) and/or external traffic information source 30 transmits recorded information on the collision to the traffic management server 20.

At S60, the traffic management server 20 analyzes the received information and determines which of the Vehicle 1 (100a) or the Vehicle 2 (100b) is liable for the collision. Detailed steps of this analysis are described in FIGS. 8.

At S71 and S72, the traffic management server 20 transmit necessary information to the Vehicle 1 (100a) and the Vehicle 2 (100b), such as information on which of the Vehicle 1 (100a) or the Vehicle 2 (100b) is liable for the collision, or instruction on how to rescue the injured passenger. At S73, the traffic management server 20 transmits necessary information to the external traffic information source 30. For example, the traffic management server 20 transmits rescue assistance request to a cellphone of a pedestrian near the site of the collision. At S74, the traffic management server 20 transmits necessary information to the appropriate facilities 40. For example, the traffic management server 20 transmits rescue assistance request to the hospital 40b or the driver's home 40c, or the information on which of the Vehicle 1 (100a) or the Vehicle 2 (100b) is liable for the collision to the insurance company 40d.

Figure 5:
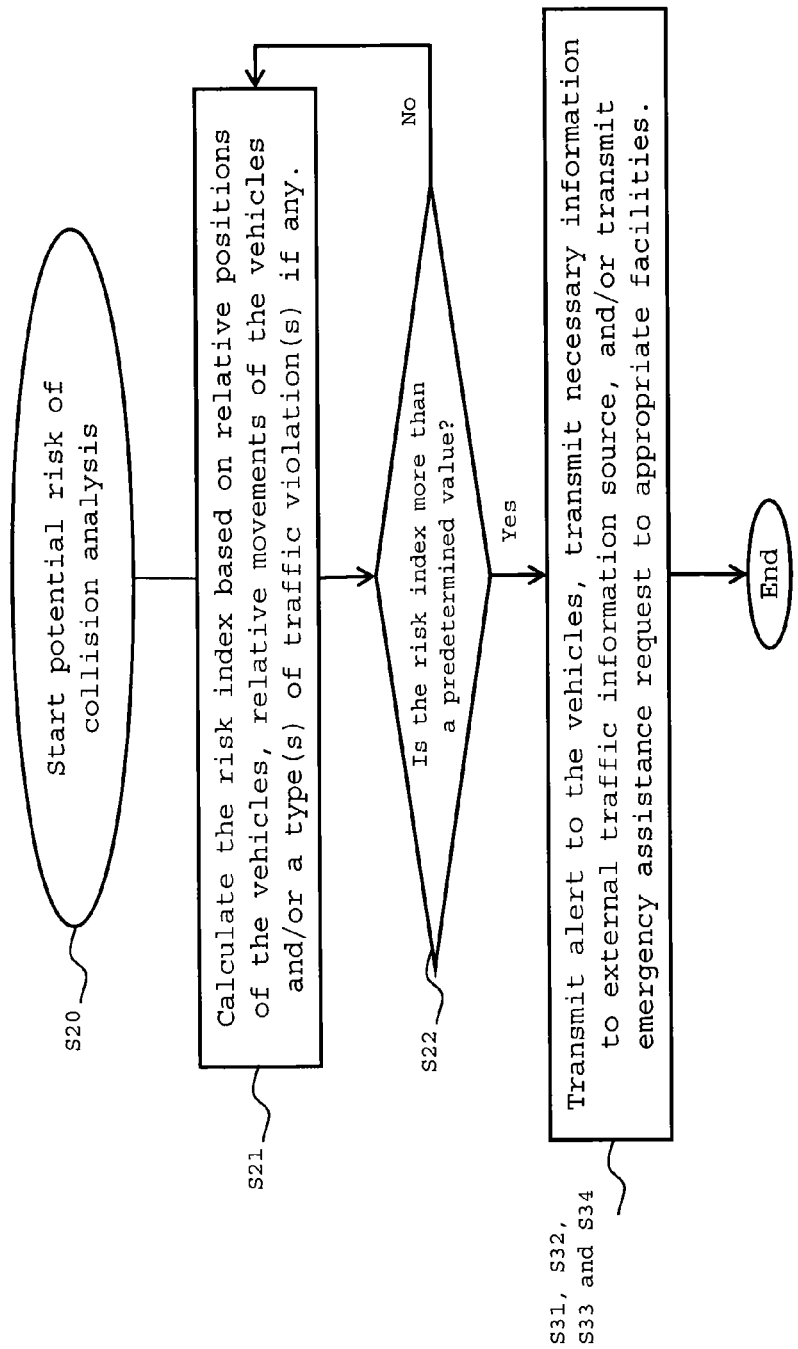
FIG. 5 is an exemplary flowchart of a potential cause of accident analysis.

FIG. 5 is an exemplary flowchart of a potential risk of collision analysis conducted by the processor/CPU 25 in the traffic management server 20. At S20, the potential risk of collision analysis starts. At S21, the processor/CPU 25 calculates the risk index which indicates the risk of collision based on relative positions of the Vehicle 1 (100a) and the Vehicle 2 (100b), relative movements of the Vehicle 1 (100a) and the Vehicle 2 (100b) and/or a type(s) of traffic violation(s) committed by Vehicle 1 (100a) and/or the Vehicle 2 (100b) if any. Then at S22, the risk index is compared with a predefined value stored in the memory 26. If the risk index is less than the predefined value, the processor/CPU 25 keeps on calculating the risk index until the risk index is more than the predefined value. If the risk index is more than the predefined value, the steps proceed to S31, S32, S33 and S34, and the processor/CPU 25 controls the transmitter/receiver 29 to transmit appropriate information to the recorder 1 (10a), recorder 2 (10b), external traffic information source 30, and/or appropriate facilities 40.

Figure 6:
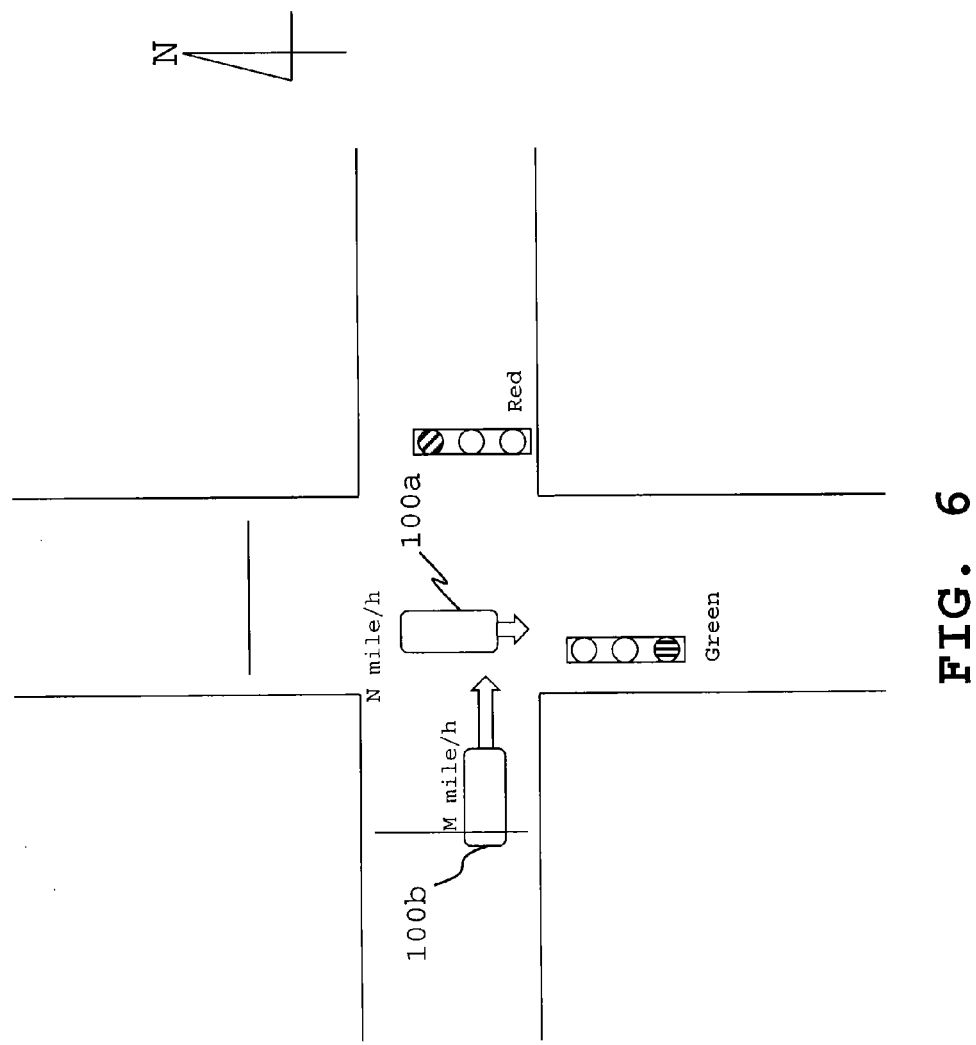
FIG. 6 is an exemplary bird's eye view of an intersection before traffic accident occurs.

FIG. 6 is an exemplary bird's eye view of an intersection before traffic accident occurs. In this example, the Vehicle 1 (100a) runs from north to south at the speed of N mile/h when the traffic light is green and the Vehicle 2 (100b) runs from west to east at the speed of M mile/h when the traffic light is red, and the Vehicle 1 (100a) is in danger of collided by the Vehicle 2 (100b).

FIG. 7 is an exemplary table of risk index of the situation shown in FIG. 6. For example, the relative positions may be defined by the relative distance between the Vehicle 1 (100a) and the Vehicle 2 (100b) (e.g., W feet) and the relative angle between the Vehicle 1 (100a) and the Vehicle 2 (100b) (e.g., X degree). The closer the relative distance between the Vehicle 1 (100a) and the Vehicle 2 (100b) is, the more the risk index may become. For example, the relative movements may be defined by the relative speed (e.g., Y feet/s) and the relative acceleration (e.g., Z feet/$s^2$) of the Vehicle 1 (100a) and the Vehicle 2 (100b). The more the relative speed or the relative acceleration are, the more the risk index may become. Type of traffic violation is such as an ignoring traffic light, a speeding offence, or a drunk driving, and according to the seriousness of the violation the risk index may be assigned (e.g., ignoring traffic light: 4 points, speeding offence (K miles/h over): 8 points, or drunk driving: 20 points). For example, whether the vehicle ignored traffic light or not may be determined by calculating the time when the vehicle passed the location of the traffic light by using location information obtained by GPS 11e and calculating the traffic light color at the time using the information received from traffic light. In another example, whether the vehicle ignored traffic light or not may be determined by analyzing the video data obtained by the external camera 11b and determining the traffic light color when the vehicle passed the traffic light. For example, the speeding offence may be determined by using traffic sign information of the area received from, for example, a remote server or stored in the memory 16, and the current speed of the vehicle obtained by the vehicle condition sensor 11g. For example, the drunk driving may be determined by the information obtained by the breath analyzer (11c).

In FIG. 7, the total risk index is calculated to be 41. The traffic management server 20 predefines each points of the risk index corresponding to certain relative positions, relative movements and a type of traffic violation beforehand. In this example, if the predefined value stored in the memory 26 is 30 for example, because the calculated risk index "41" is more than "30", the processor/CPU 25 controls the transmitter/receiver 29 to transmit appropriate information to the recorder 1 (10a), recorder 2 (10b), external traffic information source 30, and/or appropriate facilities 40.

Figure 8:
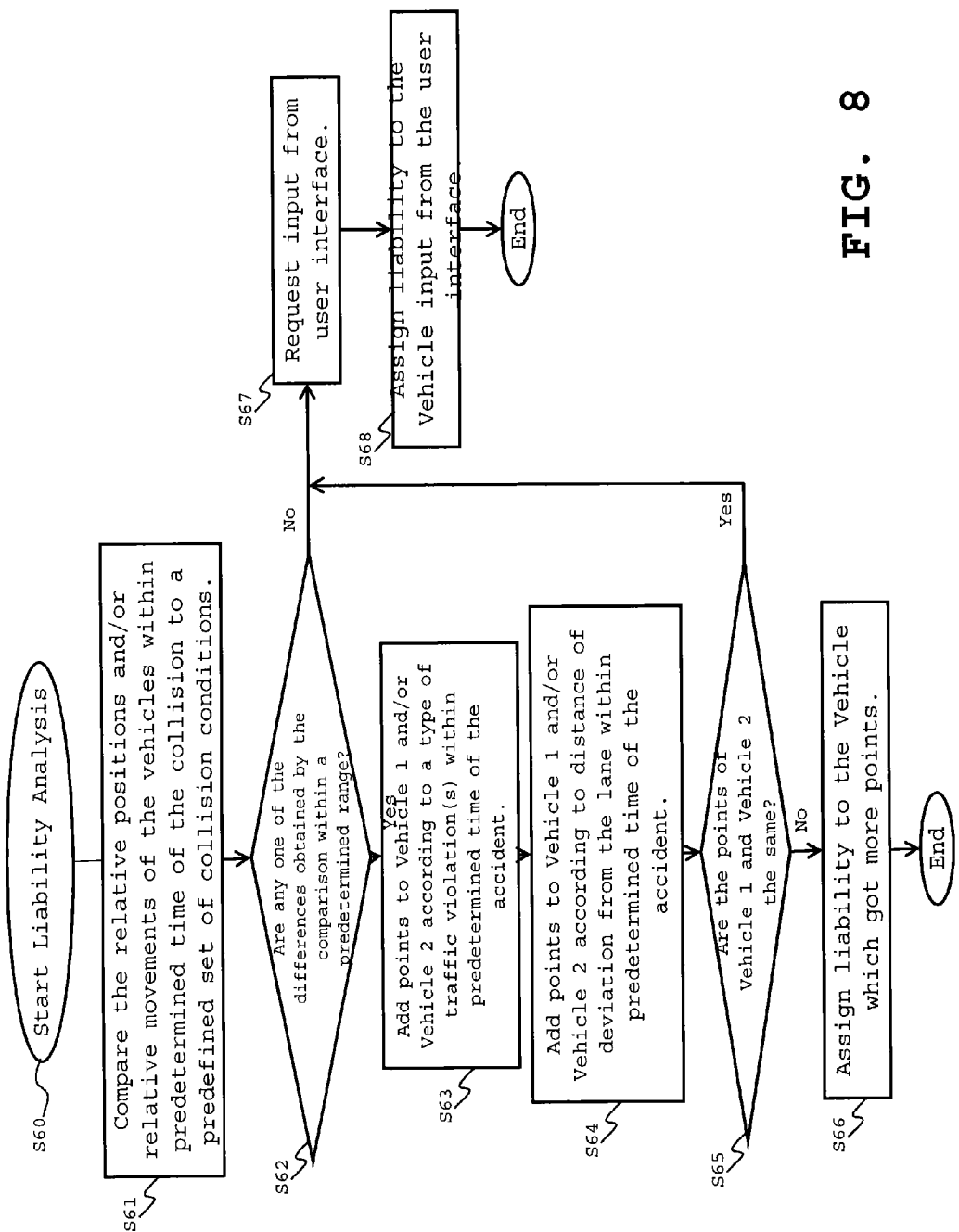
FIG. 8 is an exemplary flowchart of a liability analysis.

FIG. 8 is an exemplary flowchart of a liability analysis conducted by the processor/CPU 25 in the traffic management server 20. At S60, liability analysis starts. At S61, the processor/CPU 25 compares the relative positions and/or relative movements of the vehicles within predetermined time of the accident (e.g. 5 seconds) to a predefined set of driving accident conditions. This step is conducted to eliminate a type of collision which cannot be analyzed only by the processor/CPU 25 and which requires video data analysis by human eyes and input based on the human eye analysis.

Figure 9:
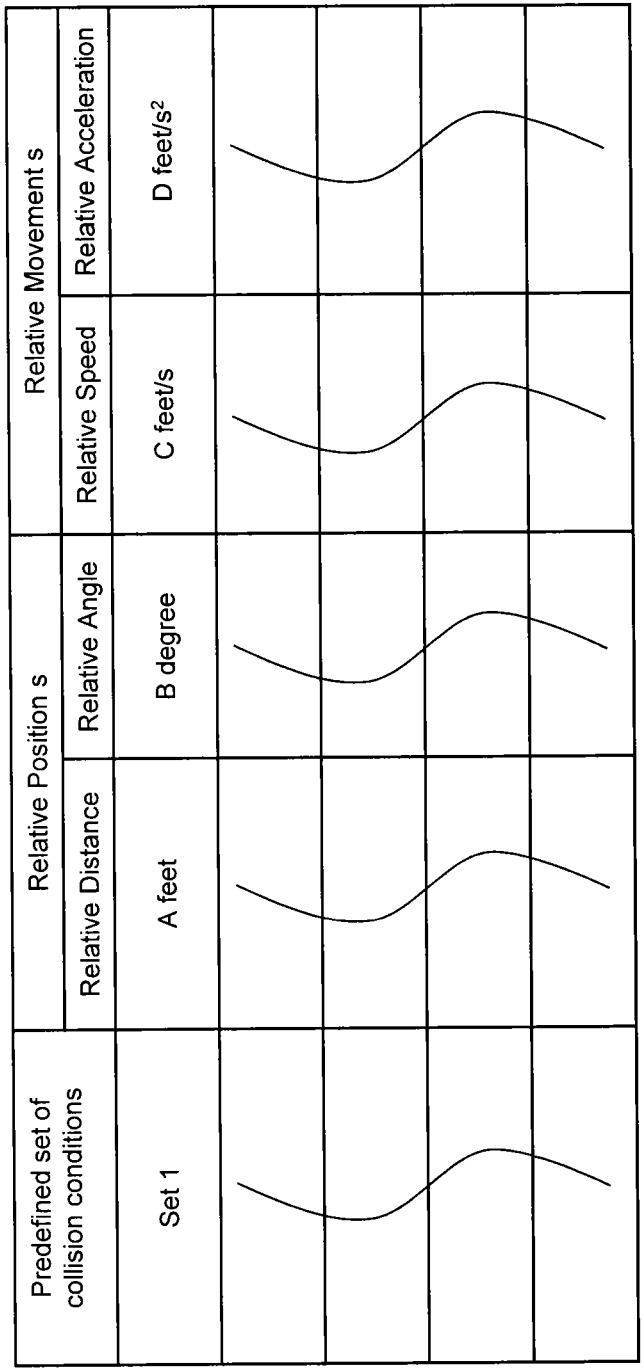
FIG. 9 is an exemplary table of predefined set of driving accidents conditions.

FIG. 9 is an exemplary table of predefined set of driving accidents conditions. The predefined set of driving accidents may be defined by relative positions of the vehicles including relative distance and relative angle of the vehicles, and relative movements of the vehicles including relative speed and relative acceleration of the vehicles. For example, set 1 of driving accidents conditions is defined by relative distance: A feet, relative angle, B degree, relative speed: C feet/s, relative acceleration: D feet/$s^2$.

Then at S62, if any one of the differences obtained by the comparison step S61 is within a predetermined (i.e. the current collision is applicable to one of the predefined set of collision conditions), the analysis proceeds to S63. On the other hand, if none of the differences obtained by the comparison step S61 is within a predetermined (i.e. the current collision is not applicable to any one of the predefined set of collision conditions), the analysis proceed to S67.

At S63, the processor/CPU 25 adds points to the Vehicle 1(100a) and/or the Vehicle 2(100b) according to a type of traffic violation(s) within predetermined time of the accident (e.g. 30 seconds). At S64, the processor/CPU 25 add points to Vehicle 1 and/or Vehicle 2 according to distance of deviation from the lane within predetermined time of the accident (e.g., 10 seconds). Then, at S65, the if the points of the Vehicle 1(100a) and the Vehicle 2(100b) are the same, the analysis proceeds to S67, and if not the same the analysis proceeds to S66. This step is conducted because when the accumulated points of the Vehicle 1(100a) and the Vehicle 2(100b) are the same, the processor/CPU 25 cannot determine which of the vehicle is liable for the collision, and a video data analysis by human eyes may be necessary. In another example, if the difference between the accumulated points of the vehicles is within a predetermined range, the analysis proceeds to S67. At S66, the processor/CPU 25 assigns a liability to the vehicle which got more points in S63 and S64.

At S67, the processor/CPU 25 controls the user interface 22 to display a message requesting an operator to input which of the vehicles is liable for the collision. The operator decides which of the vehicles is liable by watching video data transmitted from the Vehicle 1(100a), the Vehicle 2(100b) and/or the external traffic information source 30, which is displayed on the user interface 22, and input which of the vehicles is liable to the user interface 22. Then, at S68, the processor/CPU 25 assigns a liability to the vehicle input form the user interface 22.

Figure 10:
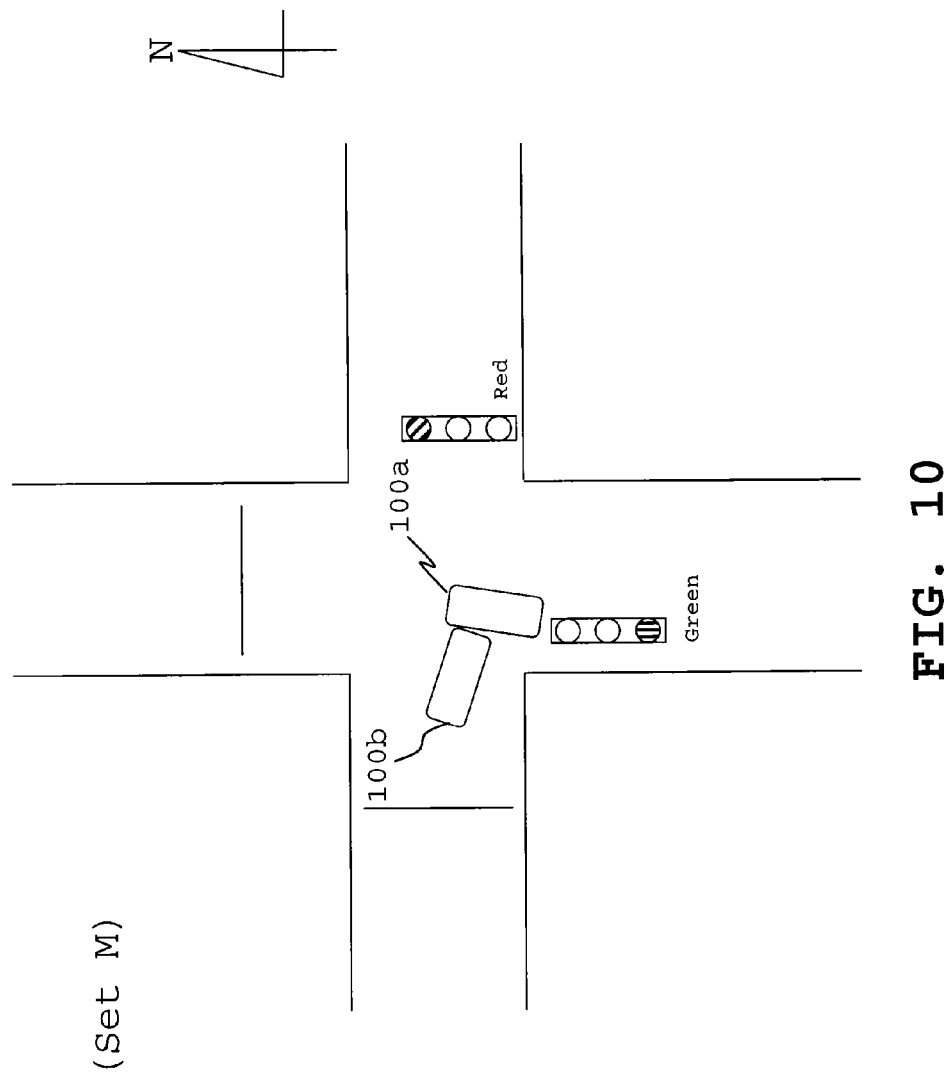
FIG. 10 is an exemplary bird's eye view of an intersection after traffic accident occurs.

FIG. 10 is an exemplary bird's eye view of an intersection after traffic accident occurs. Suppose this collision is applicable to Set M of the predefined set of collision conditions. In this example, the Vehicle 1 (100a) running from north to south when the traffic light is green is collided by the Vehicle 2 (100b) running from west to east when the traffic light is red.

FIG. 11 is an exemplary table of points assigned to Vehicle 1 and Vehicle 2 corresponding to the collision in FIG. 10. In this example, for example, the Vehicle 1 (100a) was driving exceeding the speed limit by 10 miles/hour 10 seconds before the collision, and thus 5 points is assigned to the Vehicle 1 (100a). The Vehicle 1 committed no other traffic violence and it did not deviated from the driving lane. On the other hand, the Vehicle 2 (100b) ignored traffic light (5 points assigned), it was driving exceeding the speed limit by 20 miles/hour 10 seconds before the collision (10 points assigned), the driver was drunk (20 points assigned) and it deviated from the driving lane by 5 feet (5 points assigned). Therefore, the Vehicle 1 (100a) gets 5 points in total and the Vehicle 2 (100b) gets 40 points in total, and thus the processor/CPU 25 assigns a liability to the Vehicle 2 (100b) which gets more points.

Figure 12:
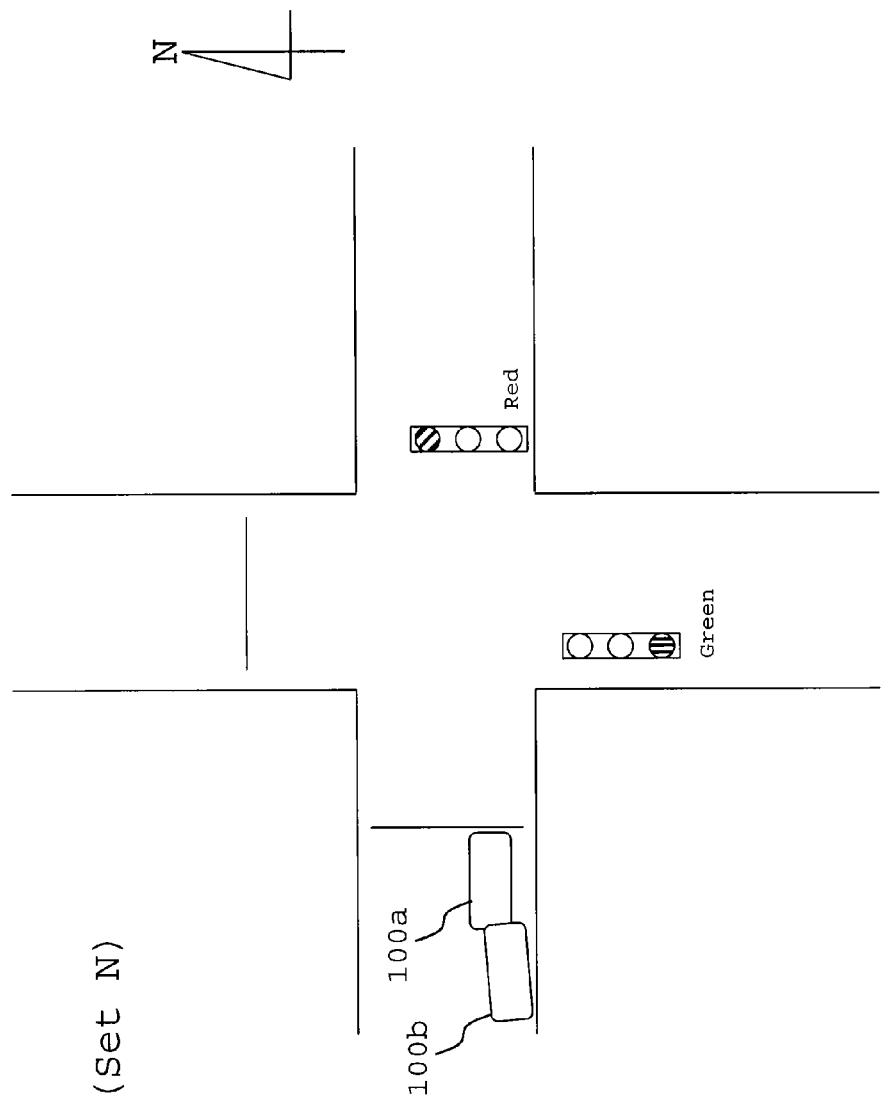
FIG. 12 is another exemplary bird's eye view of an intersection after traffic accident occurs.

FIG. 12 is another exemplary bird's eye view of an intersection after traffic accident occurs. Suppose this collision is applicable to Set N of the predefined set of collision conditions. In this example, the Vehicle 1 (100a) was waiting for the traffic light to turn to green in front of a traffic line, and the Vehicle 2 (100b) running from west to east exceeding the speed limit collide with the Vehicle 1 (100a).

FIG. 13 is another exemplary table of points assigned to Vehicle 1 and Vehicle 2 corresponding to the collision in FIG. 12. In this example, for example, the Vehicle 1 (100a) committed no traffic. On the other hand, the Vehicle 2 (100b) ignored traffic light (5 points assigned), it was driving exceeding the speed limit by 30 miles/hour 10 seconds before the collision (20 points assigned), and it deviated from the driving lane by 5 feet (5 points assigned). Therefore, the Vehicle 1 (100a) gets 0 points in total and the Vehicle 2 (100b) gets 30 points in total, and thus the processor/CPU 25 assigns a liability to the Vehicle 2 (100b) which gets more points.

The invention claimed is:

1. A traffic management server comprising:
a receiver that receives
(i) first information, that is recorded by a first recorder on a first vehicle, that includes first video data recorded by a first camera on the first vehicle, first vehicle condition information of the first vehicle, first driver information of the first vehicle and first GPS information indicating a position of the first vehicle,
(ii) second information, that is recorded by a second recorder on a second vehicle, that includes second video data recorded by a second camera on the second vehicle, second vehicle condition information of the second vehicle, second driver information of the second vehicle and second GPS information indicating a position of the second vehicle,
(iii) third information that includes third video data recorded by a surveillance camera in an area, and
(iv) fourth information that includes a chronological color change record of a traffic light in the area;
a non-transitory storage device that stores information received by the receiver and traffic sign information of the area;
a user interface that is configured to display the information stored in the non-transitory storage device, and receive an input;
processing circuitry that is configured to
determine whether the first vehicle and the second vehicle are in danger of a collision with each other by calculating whether a risk index, which is calculated based on relative positions of the first vehicle and the second vehicle, relative movements of the first vehicle and the second vehicle, and/or a type of traffic violation committed by the first vehicle and/or the second vehicle, exceeds a predetermined value or not, and
determine which of the first vehicle or the second vehicle is liable for the collision when the first vehicle and the second vehicle collide by (1) adding points to the first vehicle and/or the second vehicle according to a type of traffic violation committed by the first vehicle and/or the second vehicle within predetermined time of the collision and (2) comparing the points of the first vehicle and the second vehicle; and
a transmitter that is configured to
transmit alert information to the first vehicle and the second vehicle when the processing circuitry determines the first vehicle and the second vehicle are in danger of a collision, and
transmit information on which of the first vehicle or the second vehicle is liable for the collision to a predetermined facility.

2. The traffic management server according to claim 1, wherein the processing circuitry controls the user interface to display a request for input, and determines which of the first vehicle or the second vehicle is liable for the collision based on the input from the user interface, when
neither of differences between (1) the relative positions and/or the relative movements of the first vehicle and the second vehicle within a predetermined time of the collision and (2) a predefined set of collision conditions is within a predetermined range, or the points of the first vehicle or the second vehicle are the same or the difference of the points is within a predetermine range.

3. The traffic management server according to claim 2, wherein the processing circuitry changes the points according to a type of traffic violation based on the applicable collision condition.

4. The traffic management server according to claim 2, wherein the relative positions comprise relative distance and relative angle, and the relative movements comprise relative speed and relative acceleration.

5. The traffic management server according to claim 1, wherein the processing circuitry further adds points to the first vehicle and/or the second vehicle according to distance of deviation of the first vehicle and the second vehicle from lane, which is detected by the first camera and the second camera, within predetermined time of the collision.

6. The traffic management server according to claim 1, wherein the first vehicle condition information comprises at least one of information on speed, acceleration, brake timing, vehicle temperature, repair history and/or cumulative distance of the first vehicle, and the second vehicle condition information comprises at least one of information on speed, acceleration, brake timing, vehicle temperature, repair history and/or cumulative distance of the second vehicle.

7. The traffic management server according to claim 1, wherein the first recorder further comprises a microphone to record internal audio of the first vehicle, and the second recorder further comprises a microphone to record internal audio of the second vehicle.

8. The traffic management server according to claim 1, wherein the first camera comprises a first internal camera to record video data inside the first vehicle and a first external camera to record video data outside the first vehicle, and the second camera comprises a second internal camera to record video data inside the second vehicle and a second external camera to record video data outside the second vehicle.

9. The traffic management server according to claim 8, wherein the first external camera automatically analyzes distance of deviation of the first vehicle from lane, and the second external camera automatically analyzes distance of deviation of the second vehicle from lane.

10. The traffic management server according to claim 1, wherein the relative positions and the relative movements are calculated based on at least the first information and the second information.

11. The traffic management server according to claim 1, wherein the type of traffic violation committed by the first vehicle and/or the second vehicle is determined based on at least the first information, the second information, the fourth information and the fifth information.

12. A traffic recording apparatus on a first vehicle comprising:
a camera that records video data;
a sensor module that detects vehicle condition information including a speed, an acceleration and brake timing of the first vehicle, and driver information;
a GPS module that detects a position of the first vehicle;
a microphone that records internal audio of the first vehicle;
a non-transitory storage device that records information obtained by the camera, the sensor module, the GPS module, and the microphone;
a transmitter that transmits the information recorded to the non-transitory storage device to a traffic management server;
a receiver that receives alert information from the traffic management server indicating that the first vehicle is in danger of colliding with a second vehicle;
a user interface that alerts the driver that the first vehicle is in danger of colliding with the second vehicle;
a communication unit that enables the driver to communicate with people outside of the first vehicle; and
processing circuitry that controls the first vehicle to avoid colliding with the second vehicle when the receiver receives the alert information;
wherein the information recorded to the non-transitory storage device is not editable by the driver, and the processing circuitry controls the non-transitory storage device to erase the information recorded on the non-transitory storage device every predetermined period or when data amount recorded on the non-transitory storage device reaches a predetermined amount; and
wherein the receiver receives information on which of the first vehicle or the second vehicle is liable for a collision from the traffic management server when the first vehicle and the second vehicle collide.

13. The traffic recording apparatus according to claim 12, wherein the alert information is transmitted by the traffic management server by calculating whether a risk index, which is calculated based on relative positions of the first vehicle and the second vehicle, relative movements of the first vehicle and the second vehicle, and/or a type of traffic violation committed by the first vehicle and/or the second vehicle, exceeds a predetermined value or not.

14. The traffic recording apparatus according to claim 12, wherein the information on which of the first vehicle or the second vehicle is liable for the collision is transmitted by the traffic management by (1) adding points to the first vehicle and/or the second vehicle according to a type of traffic violation committed by the first vehicle and/or the second vehicle within predetermined time of the collision and (2) comparing the points of the first vehicle and the second vehicle.

15. The traffic recording apparatus according to claim 12, wherein the driver information includes at least one of information on weight, face pattern and fingerprint pattern of the driver.

16. The traffic recording apparatus according to claim 15, wherein the driver information comprises at least one of information on weight, face pattern or fingerprint pattern of the driver, and the processing circuitry controls the first vehicle not to start an engine on the first vehicle when the driver information detected by the sensor module is not similar to preregistered driver information stored in the non-transitory storage device.

17. The traffic recording apparatus according to claim 16, wherein the transmitter transmits alert information to a preregistered destination when the driver information detected by the sensor module is not similar to preregistered driver information stored in the non-transitory storage device.

18. The traffic recording apparatus according to claim 12, wherein the sensor module detects alcohol from breath of the driver and the processing circuitry controls the transmitter to transmit alert information to the traffic management server.

19. A traffic management method used in a traffic management server, the method comprising:
receiving (i) first information, that is recorded by a first recorder on a first vehicle, that includes: first video data recorded by a first camera on the first vehicle, first vehicle condition information of the first vehicle, first driver information of the first vehicle and first GPS information indicating a position of the first vehicle, (ii) second information, that is recorded by a second recorder on a second vehicle, that includes: second video data recorded by a second camera on the second vehicle, second vehicle condition information of the second vehicle, second driver information of the second vehicle and second GPS information indicating a position of the second vehicle, (iii) third information that includes third video data recorded by a surveillance camera in an area, (iv) fourth information that includes a chronological color change record of a traffic light in the area, and (v) fifth information that includes traffic sign information of the area;

storing the first information, the second information, the third information, the fourth information and the fifth information in a non-transitory storage device;

displaying the information stored in the non-transitory storage device;

determining whether the first vehicle and the second vehicle are in danger of a collision with each other by calculating whether a risk index, which is calculated based on relative positions of the first vehicle and the second vehicle, relative movements of the first vehicle and the second vehicle, and/or a type of traffic violation committed by the first vehicle and/or the second vehicle, exceeds a predetermined value or not;

transmitting alert information to the first vehicle and the second vehicle when it is determined that the first vehicle and the second vehicle are in danger of a collision;

determining which of the first vehicle or the second vehicle is liable for the collision when the first vehicle and the second vehicle collide by (i) adding points to the first vehicle and/or the second vehicle according to a type of traffic violation committed by the first vehicle and/or the second vehicle within predetermined time of the collision and (ii) comparing the points of the first vehicle and the second vehicle; and transmitting information on which of the first vehicle or the second vehicle is liable for the collision to a predetermined facility.

* * * * *